United States Patent
Lyle

(10) Patent No.: US 7,218,737 B1
(45) Date of Patent: May 15, 2007

(54) SYSTEM AND METHOD FOR AN ADAPTIVE STATE MACHINE TO CONTROL SIGNAL FILTERING IN A SERIAL LINK

(75) Inventor: James D. Lyle, Santa Clara, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 704 days.

(21) Appl. No.: 10/224,995

(22) Filed: Aug. 21, 2002

(51) Int. Cl.
*H04N 5/10* (2006.01)
*H04N 5/08* (2006.01)
*H04N 5/935* (2006.01)
*H04N 5/92* (2006.01)

(52) U.S. Cl. .............. 380/208; 380/210; 380/204; 380/215

(58) Field of Classification Search ........... 380/208, 380/210, 215, 204
See application file for complete search history.

(56) References Cited

U.S. PATENT DOCUMENTS 4,695,900 A * 9/1987 Honjo et al. .............. 386/44
5,249,228 A * 9/1993 Dieterich .................. 380/208
6,335,990 B1 * 1/2002 Chen et al. ................ 382/261

FOREIGN PATENT DOCUMENTS

EP 1277285 A2 * 4/1986
EP 963111 A1 * 12/1999

* cited by examiner

*Primary Examiner*—Gilberto Barrón, Jr.
*Assistant Examiner*—Venkat Perungavoor
(74) *Attorney, Agent, or Firm*—Perkins Coie LLP

(57) ABSTRACT

A method for adaptively filtering a control signal in a serial link includes monitoring for a blanking interval in a video stream having an associated clock signal and monitoring for an occurrence of a $V_{SYNC}$ signal once the blanking interval has started. A control signal is initially detected wherein the control signal occurs subsequent to the occurrence of the $V_{SYNC}$ signal. A set of properties of the control signal are recorded and a set of filter parameters are adjusted for detecting the control signal in a next blanking period based on the set of properties of the control signal.

18 Claims, 11 Drawing Sheets

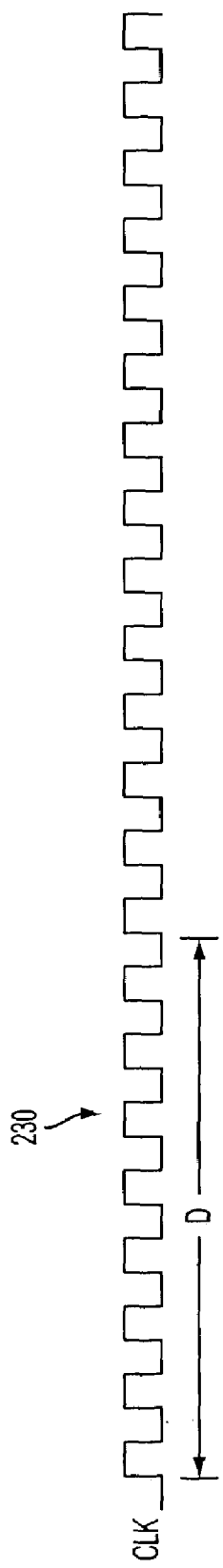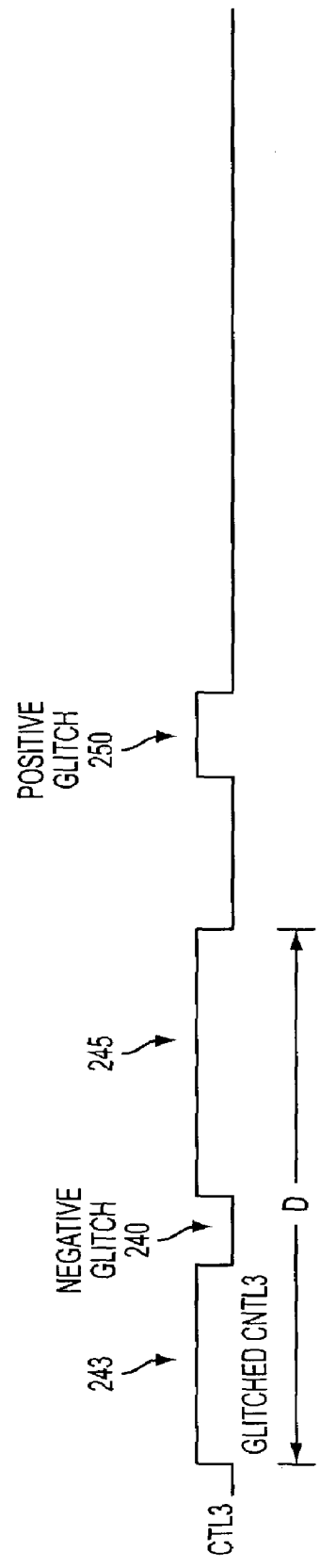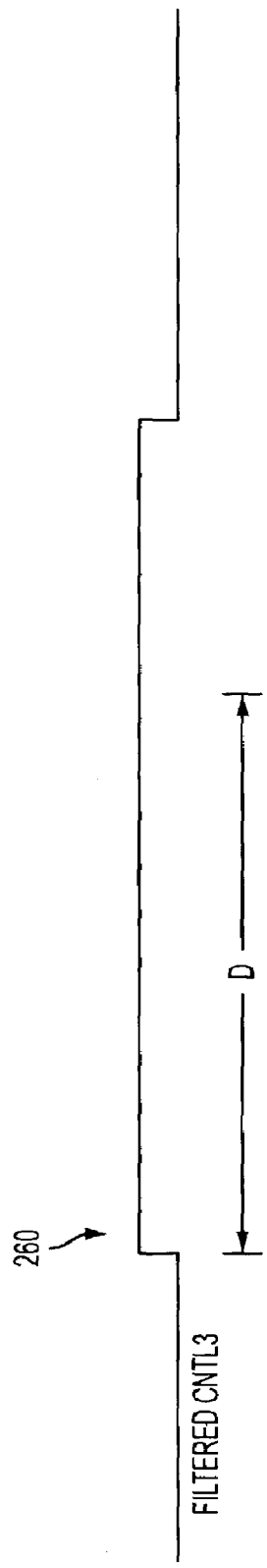

SYSTEM AND METHOD FOR AN ADAPTIVE STATE MACHINE TO CONTROL SIGNAL FILTERING IN A SERIAL LINK

FIELD OF THE INVENTION

The present invention relates generally to video systems, and more particularly to decryption of encrypted video signals.

BACKGROUND OF THE INVENTION

FIG. 1 illustrates a prior art video system 10 between a set top box 20 and a television receiver 30. Set top box 20 sometimes takes the form of a DVD player and television receiver 30 sometimes takes the form of a monitor.

The content protection protocol used in system 10 is high bandwidth digital content protection (HDCP) commonly used on DVI (digital video interface) or panel-link type interfaces. Included in the prior art system 10 is a first content protection state machine 40, in the set top box 20, and a second content protection state machine 50, in the television receiver 30. First content protection state machine 40 encrypts video data and second content protection state machine 50 decrypts the video data before it is displayed. The reason for the encryption by content protection state machine 40 is to prevent unauthorized copying of the video signal with, for example, a video tape recorder.

A modulator 60 converts various data signals, including the video data, for efficient transport over a set of differential pairs of wires 70 that are synchronized by clock 80. A demodulator 90 then reverts the signals into a control 3 (CTL3) signal 100, a 24 bit data path 110, a set of control signal lines (CTL0, CTL1 and CTL3) 120, and a clock line 130. Also included is a microprocessor 140 that controls the entire system 10. Microprocessor 140 communicates with content protection state machine 50 via DDC (display data channel) bus 142.

FIG. 2 is a timing diagram of the operational characteristics of a prior art HDCP system and further illustrates some of its limitations. In a video stream, there are sections of the signal that do not contain any video data (blanking intervals) which can be conceptually represented by a low data enable (DE) signal 150 and can also be referred to as a blanking interval. During the blanking interval 150, a vertical synchronization ($V_{SYNC}$) pulse 160 typically will be asserted, resulting in a CTL3 pulse 100. The CTL3 pulse 100 signals the content protection state machine 50 that the next video frame needs to be decrypted. A low $V_{SYNC}$ pulse can also be employed to achieve the same results. Additionally, the CTL3 pulse 100 can be coincident with a leading edge 162 of the $V_{SYNC}$ pulse 160, though the relationship between the CTL3 pulse 100 and the $V_{SYNC}$ pulse 160 is loosely defined.

The HDCP protocol specifies that the CTL3 pulse 100 needs to be at least eight clock signals wide in order for the content protection state machine 50 to be properly notified to decrypt the next video frame. A CTL3 pulse can get corrupted, however, and this results in video frames not being decrypted, when they should be, and is manifested as "snow" on a display. Conversely, video frames that do not need to be decrypted can be subjected to decryption and also results in a scrambled display. This degradation of the video signal will completely prevent the viewing of the images generated by the video signal. Some typical non-ideal CTL3 pulses include a glitch 170 or glitches 180 that will separate a CTL3 pulse into several pulses, each less than eight clock signals wide; a CTL3 pulse due to noise 190, a first false CTL3 pulse 200 where a pulse exists when one should not and a second false CTL3 pulse 210 where a pulse is present at the wrong point in time in relation to the $V_{SYNC}$ 16 and DE. Additionally, it is possible for the two numbers to match, even if the picture is not decrypted properly. In this situation, re-authentication is prevented when it is useful and necessary.

When a problem with the video decryption occurs, a re-authentication process needs to take place to restore the video image and can take up to several seconds. This is accomplished by comparing two 16 bit numbers before and after the video frame is encrypted/decrypted. If the two numbers do not match, the set top box 20 initiates the re-authentication process. Sometimes the numbers do not match up, however, even if the picture was decrypted properly. This causes an unnecessary re-authentication cycle to occur and results in a lost image which manifests as a glitch in the images generated by the video signal. Additionally, it is possible for the two numbers to match, even if the picture is not decrypted properly. In this situation, re-authentication is prevented when it is useful and necessary.

Accordingly, what is needed is a method to screen out invalid control signals, accurately detect valid control signals and prevent invalid re-synchronization cycles in order to maintain a continuous video stream on a display.

SUMMARY OF THE INVENTION

The present invention provides a system and method for an adaptive state machine to control signal filtering in a serial link. By updating filter parameters based upon the characteristics of the control signal, accurate detection of the control signal is achieved. When applied to a video transmission environment, loss of picture is virtually eliminated.

A method for adaptively filtering a control signal in a serial link, in accordance with the present invention, includes monitoring for a blanking interval in a video stream having an associated clock signal and monitoring for an occurrence of a $V_{SYNC}$ signal once the blanking interval has started. A control signal is initially detected wherein the control signal occurs subsequent to the occurrence of the $V_{SYNC}$ signal. A set of properties of the control signal are recorded and a set of filter parameters are adjusted for detecting the control signal in a next blanking period based on the set of properties of the control signal.

A system for adaptively filtering a control signal in a serial link, in accordance with the present invention, includes a transmitter that is responsive to an authentication signal and is operative to develop a plurality of data signals and a clock signal on a plurality of differential pairs. A receiver, coupled to the plurality of differential pairs, includes a demodulator that is responsive to the plurality of data signals and the clock signal and is operative to develop a control signal, a plurality of synchronization signals and the clock signal. A content protection state machine, on the receiver, is responsive to the plurality of synchronization signals, a filtered control signal and the clock signal and is operative to develop the authentication signal. A filter, on the receiver, is responsive to the control signal and a filter parameter signal and is operative to develop the filtered control. Also included is a control machine, on the receiver, that is responsive to the control signal and is operative to develop the filter parameter signal wherein the filter parameter signal is updated based on a set of characteristics of the control signal.

An advantage of the present invention is that a custom filter can be constructed that can adaptively change and thus accurately detect valid control signals while ignoring noise, glitches and invalid signals. As a result, picture display is vastly improved since interruptions to a video signal are greatly reduced. Another advantage is that the receiver can adapt the filtering mechanism to more closely match the behavior of an existing transmitter. As a result, the quality of the filtering is improved and the receiver can work well with a wide variety of transmitters manufactured by different manufacturers.

These and other advantages of the present invention will become apparent to those skilled in the art after reading the following descriptions and studying the various figures of the drawings.

BRIEF DESCRIPTION OF THE DRAWINGS

FIG. 4A illustrates a timing diagram of a system clock in accordance with the present invention.

FIG. 4B illustrates an unfiltered CTL3 pulse.

FIG. 4C illustrates a filtered CTL3 pulse in accordance with the present invention.

DETAILED DESCRIPTION OF THE INVENTION

Figure 1:
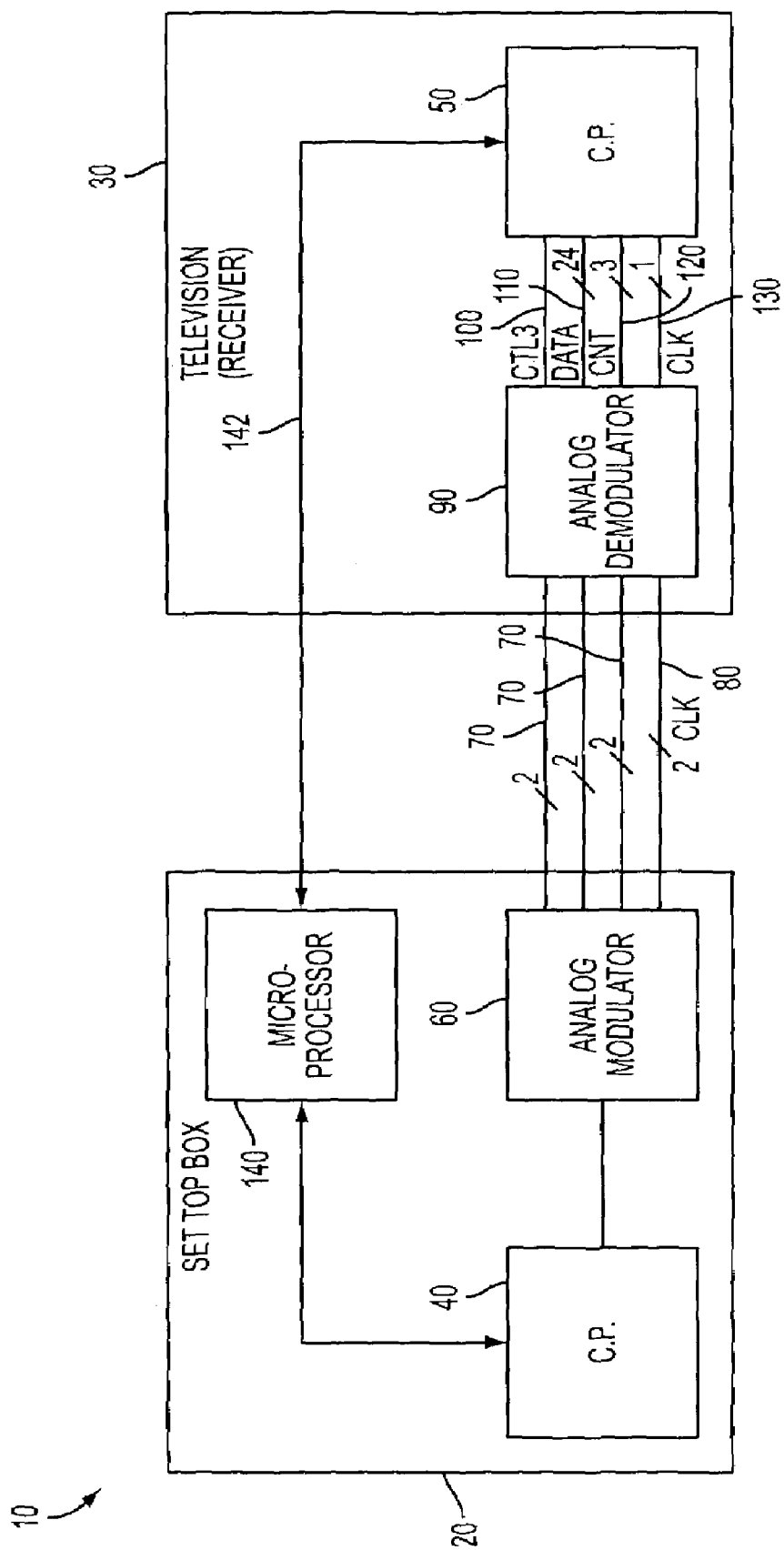
FIG. 1 is a block diagram of a prior art video system including a set top box and a television.
Figure 2:
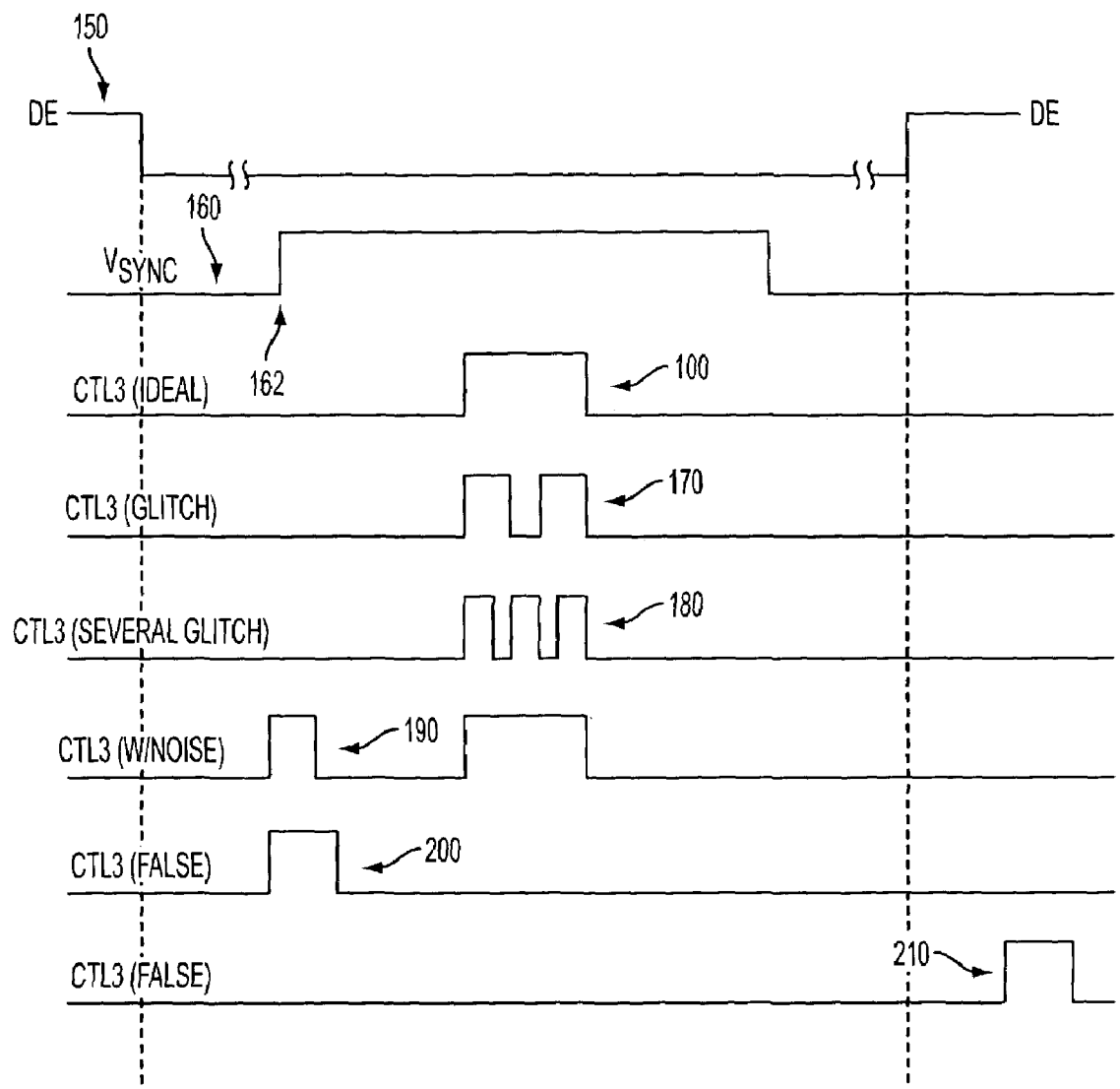
FIG. 2 is a timing diagram of the operational characteristics of a prior art HDCP system and further illustrates some of its illustrations.
Figure 3:
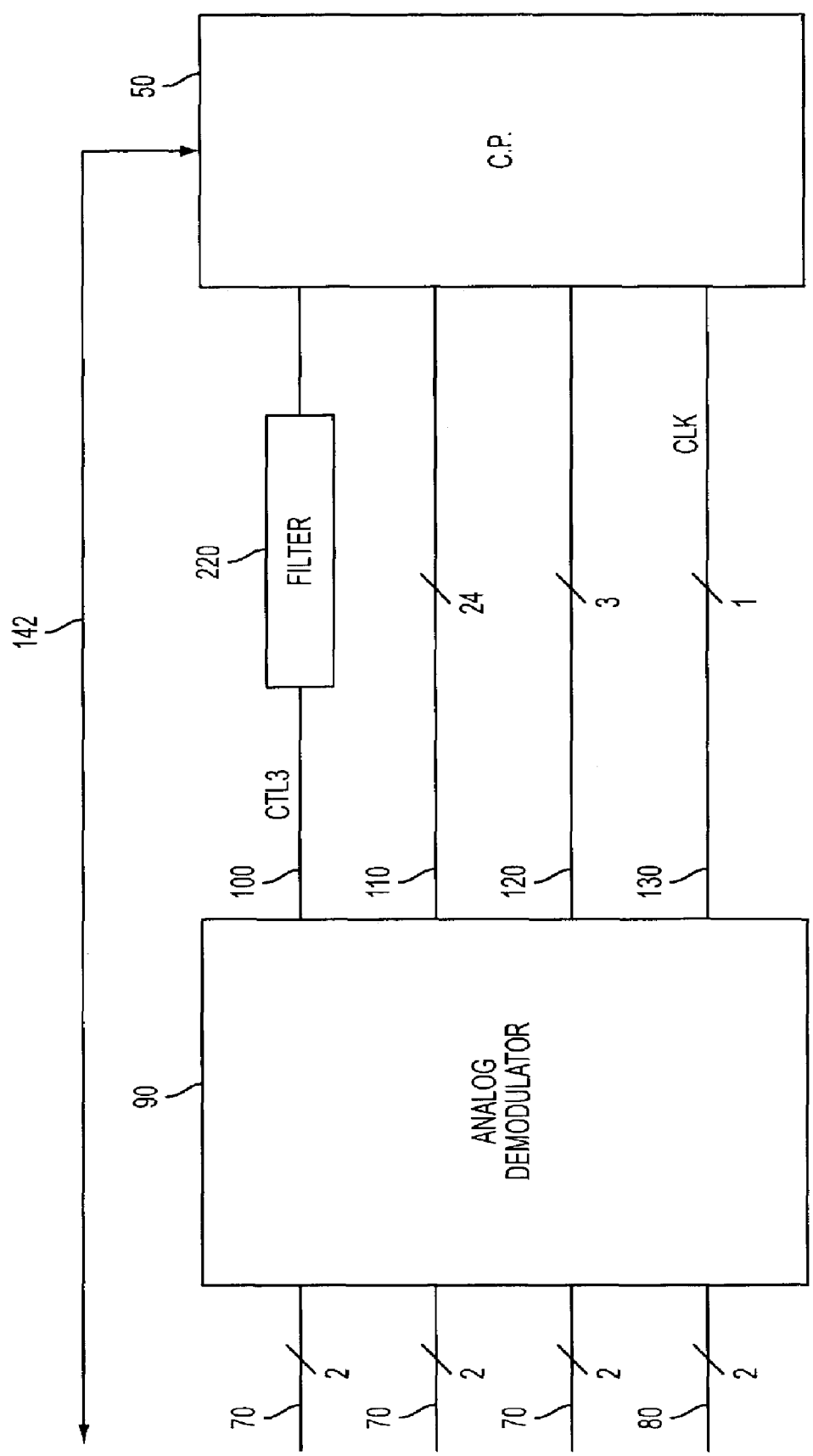
FIG. 3 illustrates a block diagram of a non-adaptive CTL3 filter on a receiver in accordance with the present invention.

FIGS. 1 and 2 were discussed in reference to the prior art. FIG. 3 illustrates a block diagram of a non-adaptive CTL3 filter 220 on a receiver (not shown) in accordance with the present invention. It will be appreciated that in the context of the present invention, the terms "set top box", "transmitter", and "DVD player" can be used interchangeably and refers to a device that can send signals to control another device as well as receive signals from that device. Additionally, a set top box can also take the form of a "personal video recorder" (PVR) which is a device that can record onto and play video images from a hard drive. It will also be appreciated that the terms "television", "monitor" and "receiver" can also be used interchangeably and refer to a device that receives signals from a transmitter as well as occasionally sending signals back to a receiver. FIG. 3 shows the inside of a television or receiver 30 as depicted in FIG. 1 with the addition of a non-adaptive filter 220. Non-adaptive filter 220 is located on the CTL3 signal wire 100. Non-adaptive filter 220 catches any pulse greater than 4 clock signals in width during a low DE signal period (blanking period). Once a CTL3 pulse is detected, any other data is ignored that may come across the CTL3 signal wire 100, until the next CTL3 window occurs. Also included is the previously described demodulator 90 that reverts the signals, received from the modulator 60 (not shown) over the set of differential wires 70 and is timed by clock 80. The reverted signals are the control 3 (CTL3) signal 100, a 24 bit data path 110, a set of control signal lines (CTL0, CTL1 and CTL2) 120 and a clock line 130. The content protection state machine 50 is responsive to the reverted signals and can conduct two-way communications with microprocessor 140 through the DDC bus 142.

FIG. 4A illustrates a timing diagram 230 of a system clock in accordance with the present invention. As previously stated, a CTL3 pulse is specified to be a minimum of 8 clock signals wide as shown by the distance "D". FIG. 4B illustrates an unfiltered CTL3 pulse. Distance D is shown again for reference. Noise in the line can cause a negative glitch 240 or a positive glitch 250 to occur, both of which results in errors to the video output. When the negative glitch 240 occurs, it causes a valid CTL3 pulse of 8 clock signals duration to be separated into two pulses 243 and 245. Positive glitch 250 typically occurs due to noise and can potentially cause the encryption to fail. FIG. 4C illustrates a filtered CTL3 pulse 260 in accordance with the present invention. Once a non-adaptive filter 220 detects a pulse of at least 4 clock signals in duration, a fixed filter depth will delay and stretch the filtered pulse 260 such that only one pulse makes it through. For the non-adaptive filter 220, the fixed filter depth equals 4. Also note that since the positive glitch 250 of FIG. 4B is less than four clock signals away from partial CTL3 pulse 245, de-assertion of the filtered CTL3 pulse 260 is delayed until 4 clocks after glitch 250 disappears.

Figure 5:
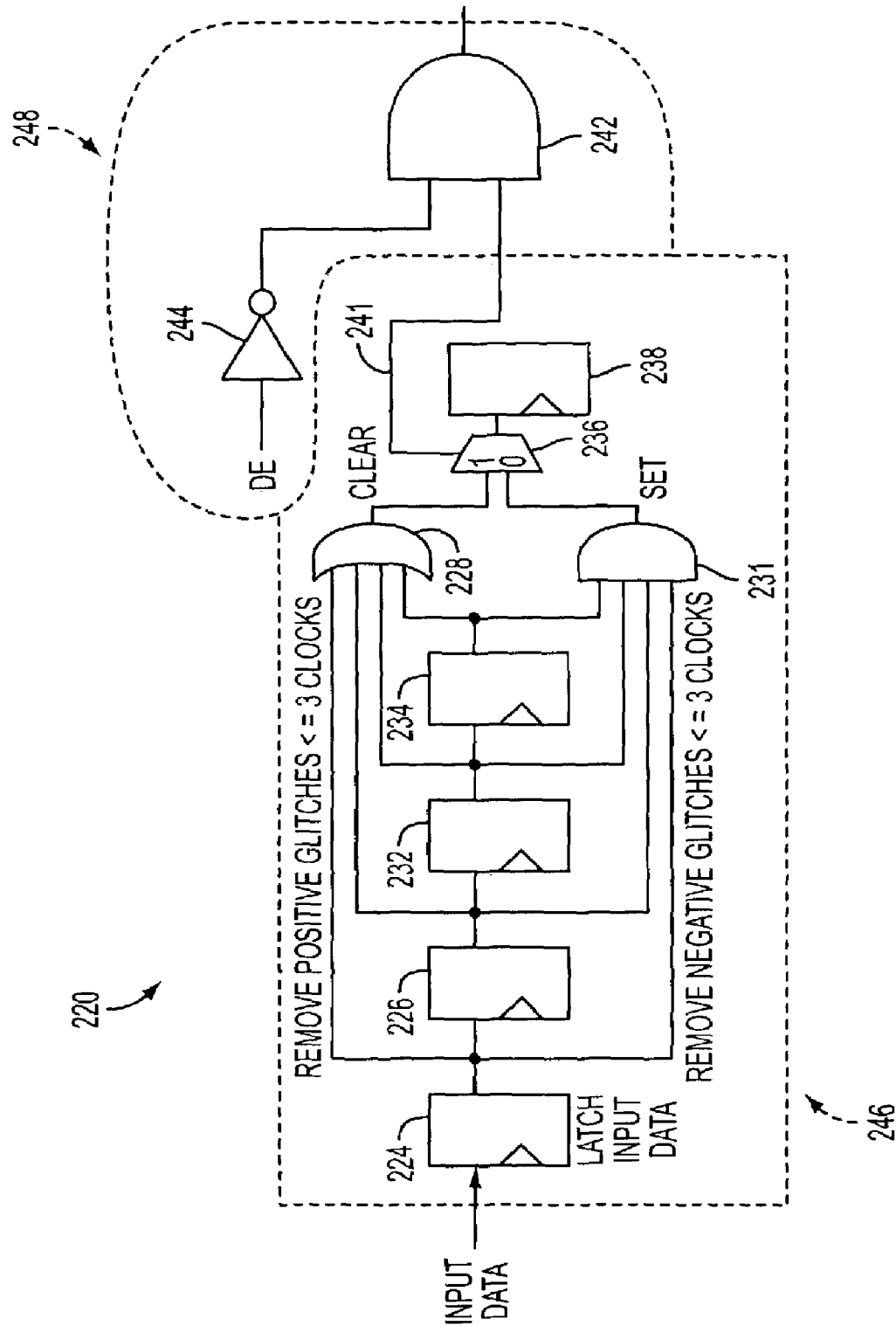
FIG. 5 illustrates a detailed view of a non-adaptive CTL3 filter in accordance with the present invention.

FIG. 5 illustrates a detailed view of a non-adaptive CTL3 filter 220 in accordance with the present invention. The non-adaptive filter 220 detects a CTL3 pulse of at least 4 clock signals in duration and a fixed filter depth will delay and stretch the filtered pulse 260 such that only one pulse makes it through. The non-adaptive filter 220 is composed of an input of a first flip-flop 224 that is coupled to the incoming data stream and has an output coupled to inputs of a second flip flop 226, an OR gate 228 as well as AND gate 231. The second flip-flop 226 has an output coupled to the inputs of the OR gate 228, the AND gate 231 and a third flip-flop 232. The third flip-flop 232 also has an output coupled to the inputs of the OR gate 228, the AND gate 231 and a fourth flip-flop 234. Similarly, the output of the third flip-flop 234 has an output coupled to the OR gate 228 as well as the AND gate 231. The output of the OR gate 228 is a CLEAR output signal and is coupled to a multiplexer 236. Also, the output of the AND gate 230 is a SET output signal and is coupled the multiplexer 236. The output of the multiplexer 236 is coupled to an input of a fifth flip-flop 238 which has an output coupled to a feedback path 241 coupled back to the multiplexer 236. The output of the fifth flip-flop 238 (flip-flop 238 is used here as a synchronizer) is also coupled to an input of a second AND gate 242. The other input of the second AND gate 242 is coupled to an output of an active high voltage inverter 244. The active high voltage inverter 244 is responsive to the DE signal.

A first section 246 of the non-adaptive filter 220 uses the input flip-flops (224, 226, 232 and 234) as a four stage pipeline that keeps track of the signal history. The first section 246 only switches states (SET or CLEAR) if all four flip-flops flops (224, 226, 232 and 234) show the same result. Consequently, any glitches that are three clock signals or less will be ignored. A second section 248 ensures that the output of the first section 246 will propagate only during a low DE signal.

Figure 6:
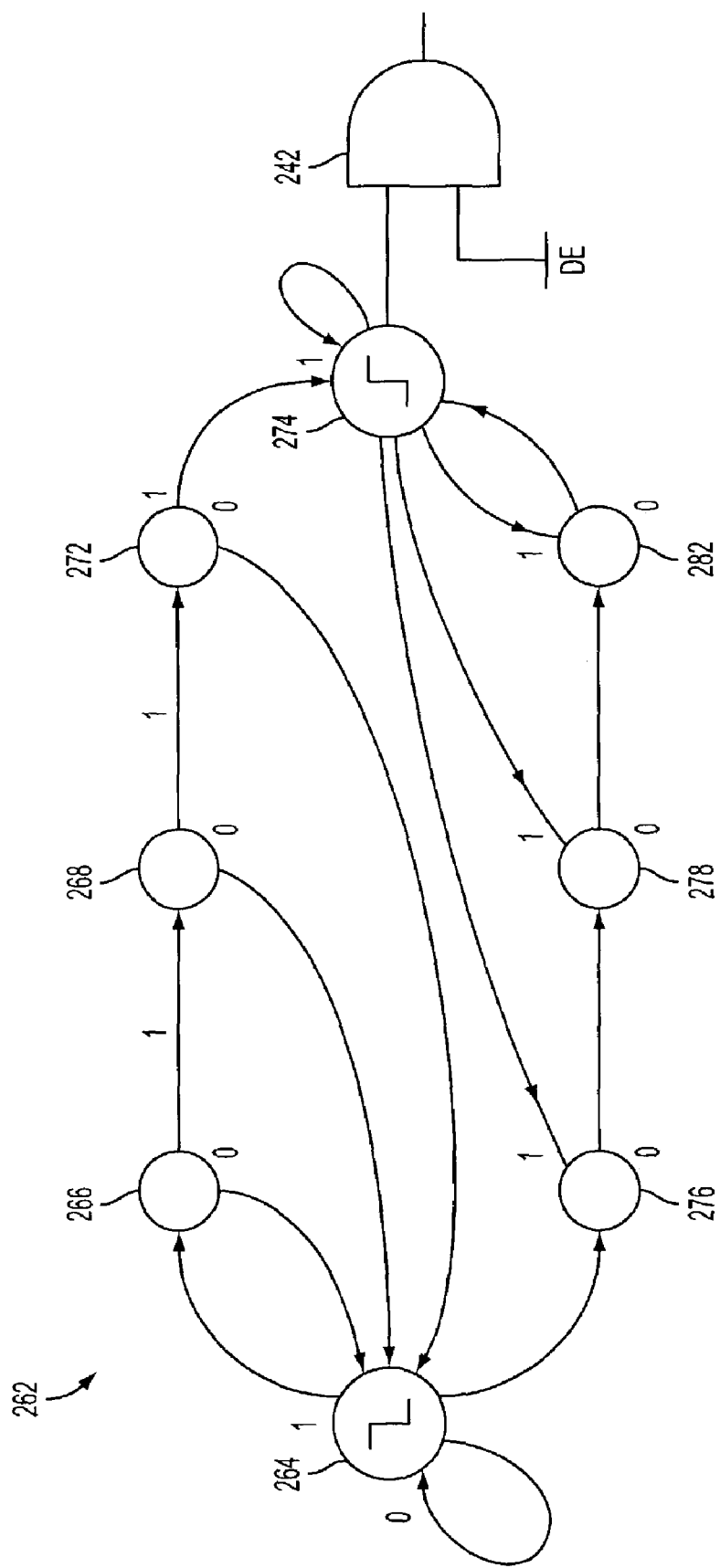
FIG. 6 illustrates a state chart of how the non-adaptive filter of FIG. 5 works in accordance with the present invention.

FIG. 6 illustrates a state chart 262 of how the non-adaptive filter 220 of FIG. 5 works in accordance with the present invention. State diagram 262 graphically depicts how the circuit of FIG. 5 functions. A state 264 waits for a '1' to occur. If three more 1's occur at states 266, 268 and 272, the output at state 274 will go high. If a '0' occurs at any state 266, 268 and 272, the circuit goes back to state 264 and waits for another 1 to occur. States 276, 278 and 282 works in a similar manner but uses 0's and works from state 274 and works right to left (states 282 to 278 to 276). State 274 waits for a 0 to occur. If three more 0's occur at states 282, 278 and 276, the output at state 264 will go low. If a '1' occurs at any state 282, 278 and 276, the circuit goes back to state 274 and waits for another 0 to occur.

Figure 7:
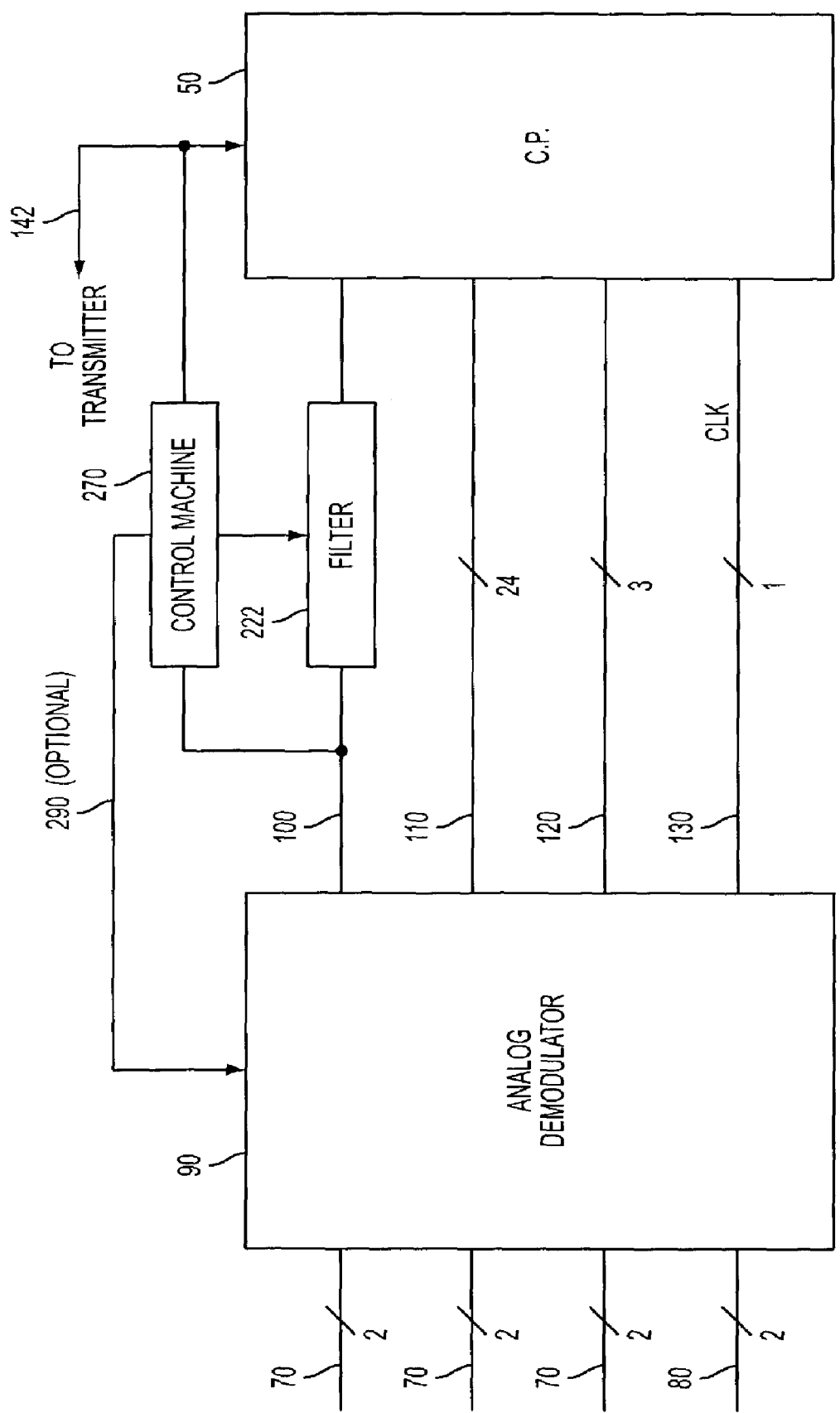
FIG. 7 illustrates a block diagram of an adaptive filter on a receiver in accordance with the present invention.

While the use of the non-adaptive filter 220 is an improvement, it is still possible to miss a CTL3 signal due to glitches or a false signal could occur due to noise on the control line. The use of an adaptive filter 222, as illustrated in the block diagram of FIG. 7, improves upon the use of a non-adaptive filter 220. In addition to the adaptive filter 222, a control machine 270 is also present that is capable of adjusting filter parameters based on the CTL3 pulse position in relation to a $V_{SYNC}$ pulse, CTL3 pulse width and noise. If there is too much noise in the CTL3 signal, control machine 270 can communicate to the transmitter (not shown) via the DDC bus 142 to reduce CTL3 line noise, via link 290. In a secondary embodiment of the present invention, the control machine could also possibly communicate to the demodulator 90, via link 290, which can adjust phase lock loop circuits located inside the demodulator 90, in an effort to reduce CTL3 line noise. Also included is the previously described demodulator 90 that reverts the signals, received from the modulator 60 (not shown) over the set of differential wires 70 and is timed by clock 80. The reverted signals are the control 3 (CTL3) signal 100, a 24 bit data path 110, a set of control signal lines (CTL0, CTL1 and CTL2) 120 and a clock line 130. The content protection state machine 50 is responsive to the reverted signals and can conduct two way communications with microprocessor 140 through the DDC bus 142.

Figure 8:
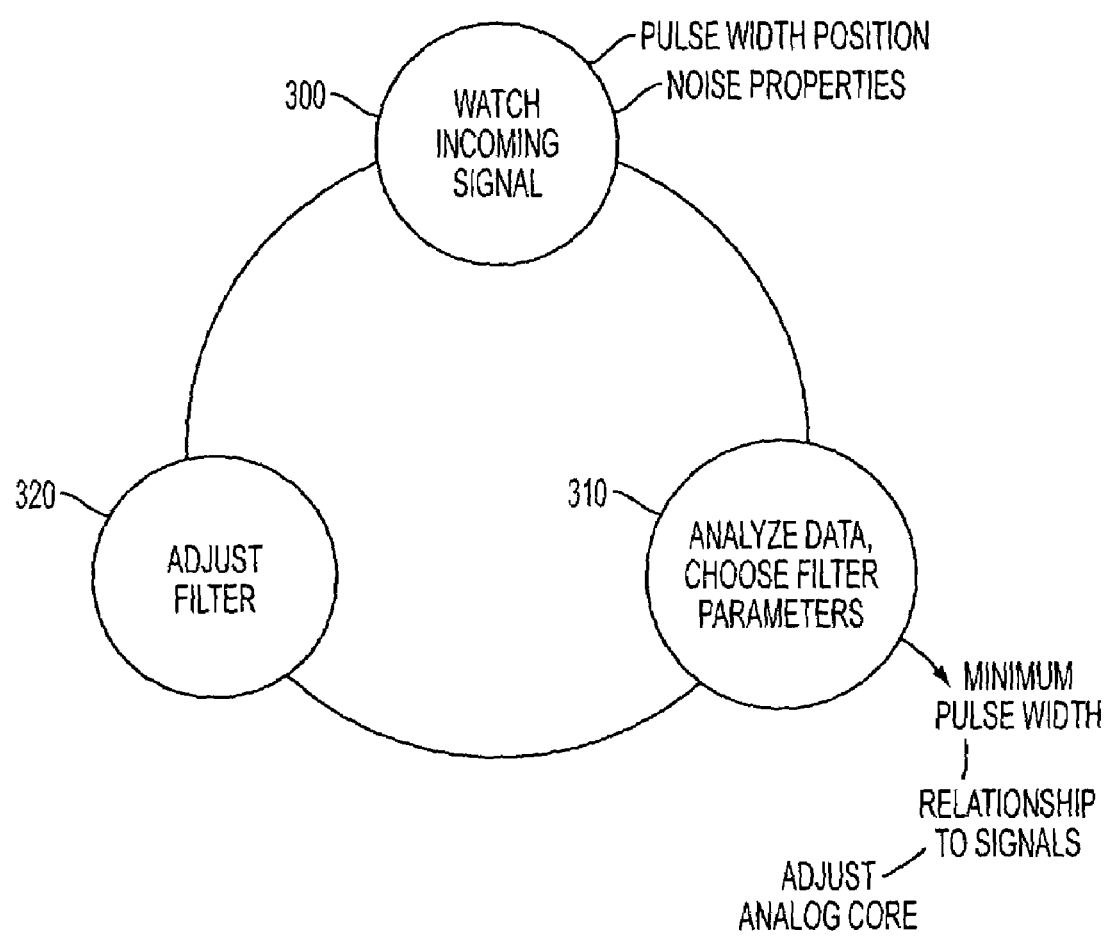
FIG. 8 illustrates how a control machine functions in accordance with the present invention.

FIG. 8 illustrates how the control machine 270 functions in accordance with the present invention. At a step 300, the CTL3 line 100 is watched for an incoming signal. Once a signal is detected, pulse width position and noise properties are observed and perhaps repeatedly observed for a short period of time. At a step 310, the data is analyzed and appropriate filter parameters are chosen. Some of these parameters include minimum pulse width, pulse width location relative to other signals and noise. If there is too much noise on the CTL3 line 100, the control machine can tell the demodulator 90 to adjust the incoming CTL3 signal, via link 290. The adaptive filter 222 is then adjusted at a step 320, based on the results of 310. In one embodiment of the present invention, the filter parameters are updated continuously. In an additional embodiment of the present invention, the filter parameters are updated a finite number of times, or at specific moments or intervals. In another embodiment of the present invention, once a valid CTL3 pulse is detected, the CTL3 pulse is ignored until a next allowable window or blanking period.

Figure 9:
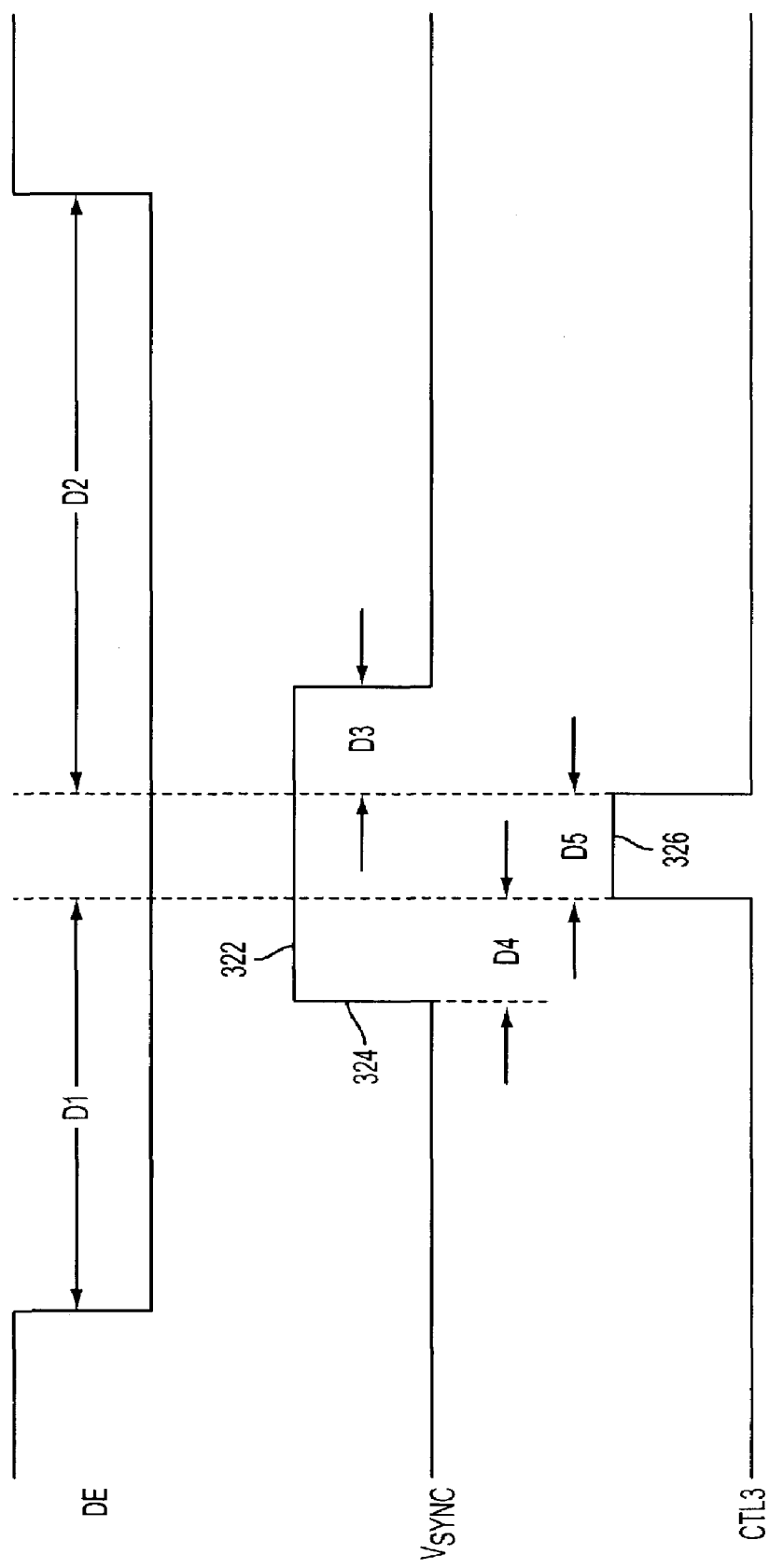
FIG. 9 illustrates various parameters that a control machine can use in accordance with the present invention.

FIG. 9 illustrates various parameters that a control machine 270 can use in accordance with the present invention. These parameters include setup from DE to CTL3 D1, setup from CTL3 to DE D2, setup from CTL3 to $V_{SYNC}$ D3, setup from $V_{SYNC}$ to CTL3 D4 and CTL3 pulse width D5. It should be noted that all of these parameters are not necessary for the proper function of the present invention and that various combinations can be used for adjusting an adaptive filter. In a preferred embodiment, the CTL3 pulse width D5 and setup from $V_{SYNC}$ to CTL3 D4 are used. It will be appreciated by one skilled in the art that FIG. 9 assumes a positive going $V_{SYNC}$ pulse 322, but for some video formats a $V_{SYNC}$ pulse 322 can be negative going. It will also be appreciated that D4 is the delay from the $V_{SYNC}$ leading edge 324. Also note that the CTL3 pulse 326 may occur before, during or after the $V_{SYNC}$ pulse 322. As a result, D4, and possibly other parameters (D1, D2, D3, and D5), may be a negative value. This is valid and within the spirit and scope of the present invention.

Figure 10:
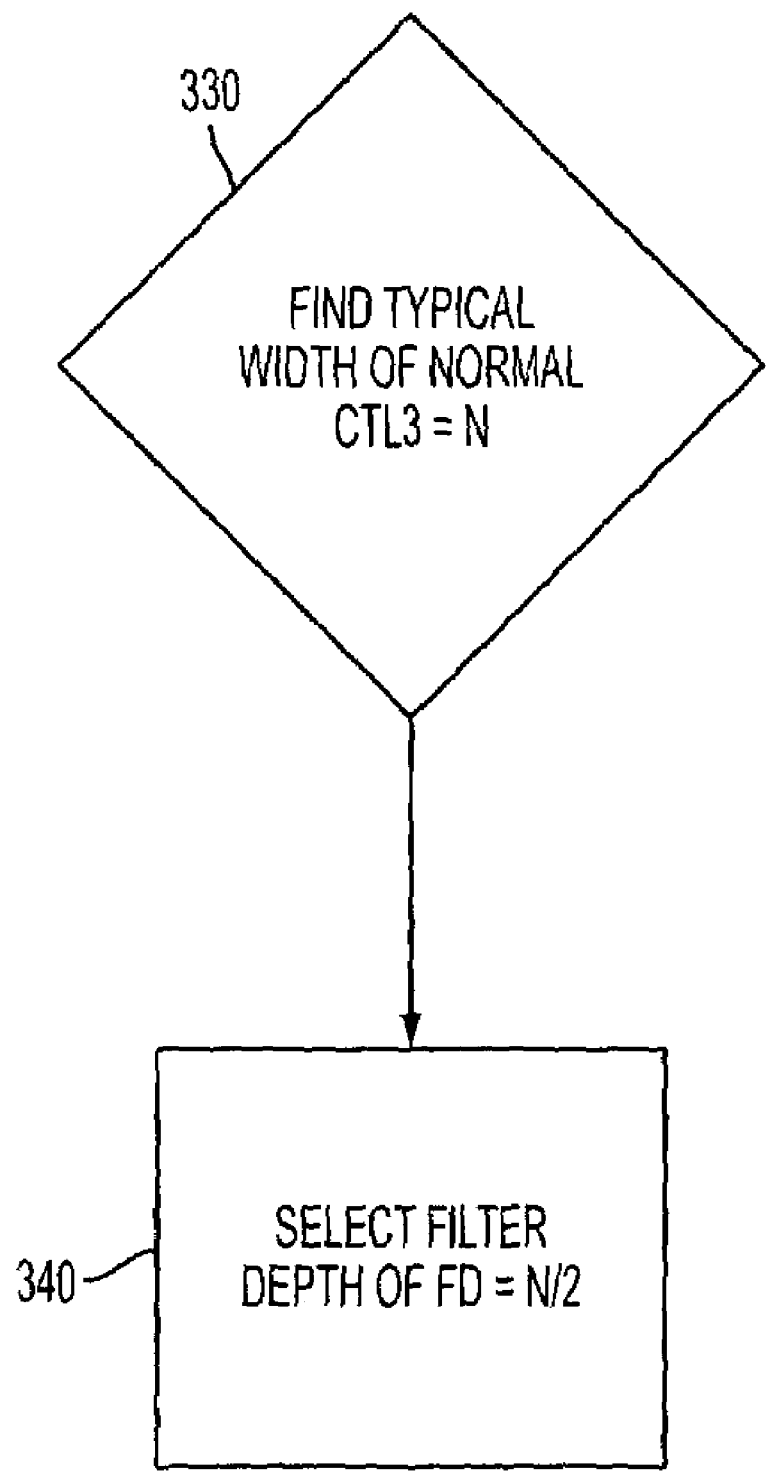
FIG. 10 illustrates how an adaptive filter selects a filter depth in accordance with the present invention.

FIG. 10 illustrates how an adaptive filter selects a filter depth in accordance with operation 310 of FIG. 8. At an operation 330, a typical CTL3 width D5 is determined by counting a number of clocks during which CTL3 is a 1. The typical width is set to N. At an operation 340, a filter depth of N/2 is selected. Restated, CTL3 glitches shorter than N/2 clocks wide will be rejected by the adaptive filter. It will be appreciated by those skilled in the art that N/2 is not the only filter depth that may be employed and that other ratios may be more effective in some situations.

Figure 11:
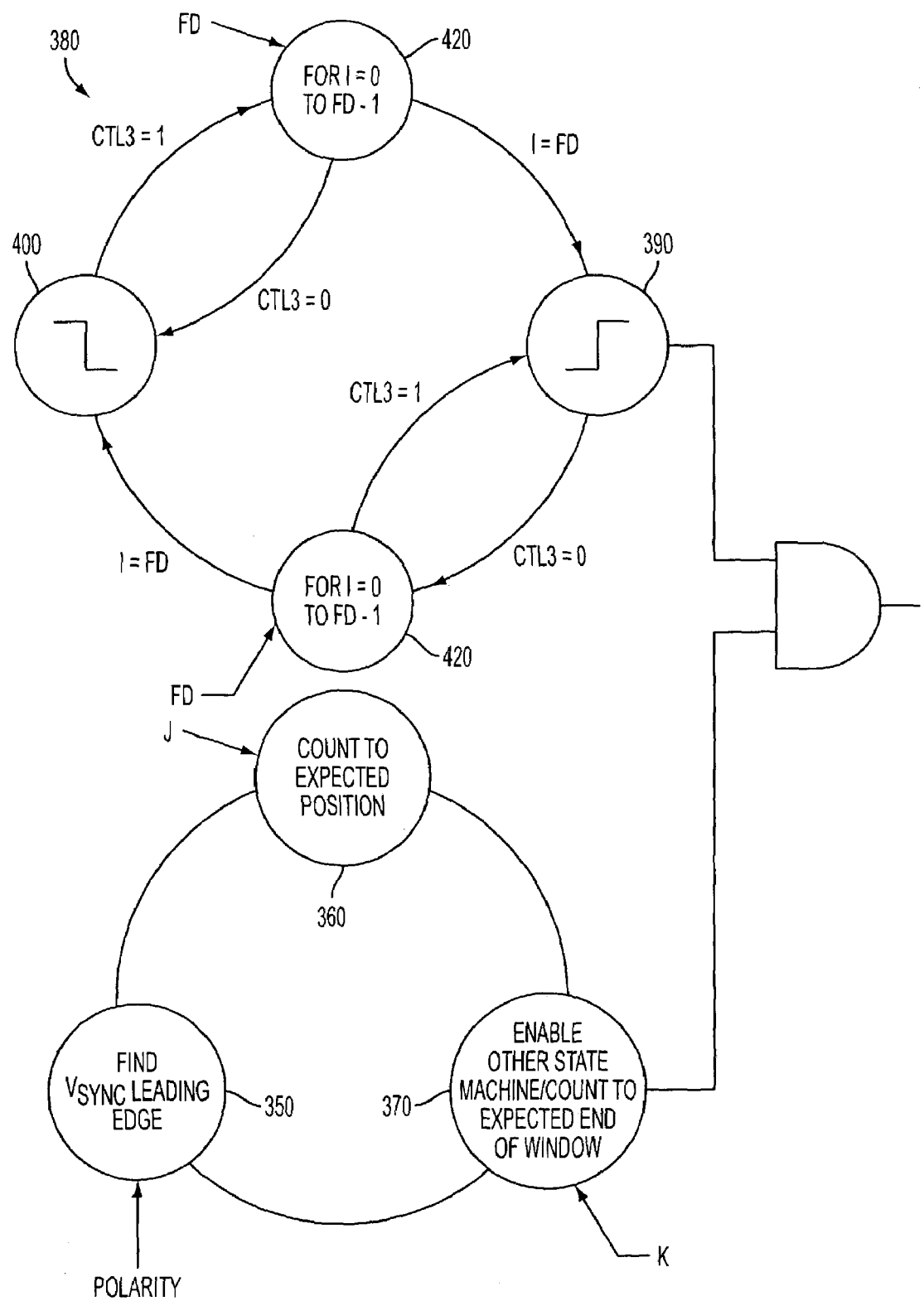
FIG. 11 illustrates how an adaptive filter qualifies the position of a CTL3 signal in relation to a $V_{SYNC}$ pulse.

FIG. 11 illustrates how an adaptive filter qualifies the position of a CTL3 signal in relation to a $V_{SYNC}$ pulse depth in accordance with operation 310 of FIG. 8. At an operation 350, the leading edge of $V_{SYNC}$ is determined, using its polarity as a guide. A count is then begun to the expected position of a CTL3 signal in an operation 360. At operation 370, a count is begun to the end of the $V_{SYNC}$ window and is equated to a parameter K that describes the position of the CTL3 pulse in relation to the $V_{SYNC}$ leading edge. Also, a CTL3 width state machine 380 is enabled.

When the CTL3 width state machine 380 is enabled, a CTL3 rising edge 390 or CTL3 falling edge 400 is watched for. A count is then initiated at operations 410 and 420 to determine the width of the CTL3 pulse, which is equated to the filter depth FD. Restated, the width of the CTL3 pulse and its relationship to the leading transition on $V_{SYNC}$ are the filter parameters used to identify valid CTL3 pulses.

An advantage of the present invention is that a custom filter can be constructed that can adaptively change and thus accurately detect valid control signals while ignoring noise, glitches and invalid signals. As a result, picture display is vastly improved since interruptions to a video signal are greatly reduced. Another advantage is that the receiver can adapt the filtering mechanism to more closely match the behavior of an existing transmitter. As a result, the quality of the filtering is improved and the receiver can work well with a wide variety of transmitters manufactured by different manufacturers.

While this invention has been described in terms of certain preferred embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. A method for adaptively filtering a control signal in a serial link comprising:
  monitoring for a blanking interval in a video stream having an associated clock signal;

monitoring for an occurrence of a $V_{SYNC}$ signal once the blanking interval has started;

initially detecting a control signal wherein the control signal occurs subsequent to the occurrence of the $V_{SYNC}$ signal;

recording a set of properties of the control signal; and adjusting a set of filter parameters for detecting the control signal in a next blanking period based on the set of properties of the control signal.

2. The method as recited in claim 1 wherein the control signal occurs concurrent to the occurrence of the $V_{SYNC}$ signal.

3. The method as recited in claim 1 wherein the control signal occurs antecedent to the occurrence of the $V_{SYNC}$ signal.

4. The method as recited in claim 1 wherein the set of filter parameters is adjusted only during an initial set of blanking periods containing the control signal.

5. The method as recited in claim 1 wherein a balance of the blanking interval is no longer monitored for the occurrence of the $V_{SYNC}$ signal after the control signal is detected.

6. The method as recited in claim 1 wherein the set of properties of the control signal comprises a typical width of the control signal, a noise property of the control signal and a position of the control signal in relation to the $V_{SYNC}$ signal and the blanking interval.

7. The method as recited in claim 6 wherein the set of filter parameters comprises a filter depth, a percentage width of the control signal and an expected position of the control signal in relation to the $V_{SYNC}$ signal.

8. The method as recited in claim 6 wherein the noise property of the control signal is transmitted to a transmitter that generated the control signal in order to reduce an amount of noise in the control signal.

9. The method as recited in claim 6 wherein the noise property of the control signal is transmitted to a demodulator that demodulates the control signal in order to reduce an amount of noise in the control signal.

10. The method as recited in claim 1 wherein the control signal signifies that a next video frame needs to be decrypted.

11. The method as recited in claim 1 wherein a DVD player generates the control signal, the blanking interval and the $V_{SYNC}$ signal.

12. The method as recited in claim 1 wherein a satellite decoder generates the control signal, the blanking interval and the $V_{SYNC}$ signal.

13. The method as recited in claim 1 wherein a personal video recorder generates the control signal, the blanking interval and the $V_{SYNC}$ signal.

14. The method as recited in claim 11 wherein the control signal, the blanking interval and the $V_{SYNC}$ signal are sent to a television.

15. The method as recited in claim 12 wherein the control signal, the blanking interval and the $V_{SYNC}$ signal are sent to a television.

16. The method as recited in claim 13 wherein the control signal, the blanking interval and the $V_{SYNC}$ signal are sent to a television.

17. A system for adaptively filtering a control signal in a serial link comprising:

a transmitter responsive to an authentication signal and operative to develop a plurality of data signals and a clock signal on a plurality of differential pairs;

a receiver, coupled to said plurality of differential pairs, including a demodulator responsive to the plurality of data signals and the clock signal and operative to develop a control signal, a plurality of synchronization signals and the clock signal;

a content protection state machine, on the receiver, responsive to the plurality of synchronization signals, a filtered control signal and the clock signal and operative to develop the authentication signal;

a filter, on the receiver, responsive to the control signal and a filter parameter signal and operative to develop the filtered control; and a control machine, on the receiver, responsive to the control signal and operative to develop the filter parameter signal wherein the filter parameter signal is updated based on a set of characteristics of the control signal.

18. The system as recited in claim 17 wherein the demodulator is responsive to and operative to develop the plurality of data signals.

* * * * *